(12) United States Patent
Manjunath et al.

(10) Patent No.: US 11,386,067 B2
(45) Date of Patent: Jul. 12, 2022

(54) DATA INTEGRITY CHECKING IN A DISTRIBUTED FILESYSTEM USING OBJECT VERSIONING

(71) Applicant: Red Hat, Inc., Raleigh, NC (US)

(72) Inventors: Raghavendra Manjunath, Westford, MA (US); Venky Shankar, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 1230 days.

(21) Appl. No.: 15/055,275

(22) Filed: Feb. 26, 2016

(65) Prior Publication Data
US 2017/0169069 A1     Jun. 15, 2017

Related U.S. Application Data

(60) Provisional application No. 62/267,576, filed on Dec. 15, 2015.

(51) Int. Cl.
| | |
|---|---|
| *G06F 16/00* | (2019.01) |
| *G06F 16/23* | (2019.01) |
| *G06F 16/13* | (2019.01) |
| *G06F 16/14* | (2019.01) |

(52) U.S. Cl.
CPC .......... *G06F 16/2365* (2019.01); *G06F 16/13* (2019.01); *G06F 16/152* (2019.01)

(58) Field of Classification Search
CPC ..... G06F 16/13; G06F 16/152; G06F 16/2365
USPC ........................................................ 707/690
See application file for complete search history.

(56) References Cited

U.S. PATENT DOCUMENTS

| | | | | |
|---|---|---|---|---|
| 5,864,837 | A | * | 1/1999 | Maimone ............ G06F 12/0815 |
| 5,978,585 | A | * | 11/1999 | Crelier ...................... G06F 8/48 |
| | | | | 717/145 |
| 6,098,079 | A | | 8/2000 | Howard |
| 6,298,478 | B1 | * | 10/2001 | Nally ...................... G06F 9/466 |
| | | | | 717/170 |

(Continued)

FOREIGN PATENT DOCUMENTS

EP     1035482     9/2000

OTHER PUBLICATIONS

Shankar, "BitRot Detection in GlusterFS", <events.linuxfoundation.org/sites/events/files/slides/BitRot-Detection-LCE-2015.pdf>, published on 2015.

(Continued)

*Primary Examiner* — Ashish Thomas
*Assistant Examiner* — Rezwanul Mahmood
(74) *Attorney, Agent, or Firm* — Lowenstein Sandler LLP

(57) ABSTRACT

A processing device identifies an object that is assigned an object version indicating a modification operation has been performed on the object, and a signature version representing a version of data of the object for which a first signature has been created. The first signature is stored in a data store. The processing device determines whether the object is currently under modification by comparing a value of the object version to a value of the signature version, creates a second signature for the object using the data of the object, responsive to a determination that the object is not under modification, and performs a data integrity analysis on the data of the object by determining whether the first signature matches the second signature.

20 Claims, 8 Drawing Sheets

(56) References Cited

U.S. PATENT DOCUMENTS

| | | | |
|---|---|---|---|
| 6,438,590 B1* | 8/2002 | Gartner | H04L 29/06 709/219 |
| 6,604,236 B1* | 8/2003 | Draper | G06F 16/1756 717/170 |
| 6,704,730 B2 | 3/2004 | Moulton et al. | |
| 7,032,114 B1* | 4/2006 | Moran | G06F 21/554 713/176 |
| 7,076,783 B1* | 7/2006 | Frank | H04L 43/0811 719/313 |
| 7,487,169 B2* | 2/2009 | Agarwal | H03M 7/3084 |
| 7,640,363 B2* | 12/2009 | Teodosiu | H04L 69/04 707/999.203 |
| 7,676,845 B2* | 3/2010 | Thomas | G06F 21/564 713/189 |
| 7,827,154 B1* | 11/2010 | Spertus | G06F 11/079 707/689 |
| 8,386,430 B1* | 2/2013 | Myhill | G06F 11/1469 707/640 |
| 8,688,967 B2* | 4/2014 | Smith | G06F 21/57 713/1 |
| 8,793,499 B2* | 7/2014 | Loughry | G06F 21/64 713/193 |
| 8,805,901 B1 | 8/2014 | Jacobs et al. | |
| 9,083,770 B1* | 7/2015 | Drose | H04L 67/02 |
| 10,262,024 B1* | 4/2019 | Subramanian | G06F 16/152 |
| 10,909,086 B2* | 2/2021 | Darcy | G06F 16/137 |
| 2002/0170052 A1* | 11/2002 | Radatti | G06F 16/2255 707/999.01 |
| 2002/0184259 A1* | 12/2002 | Akishita | G06F 21/10 715/201 |
| 2003/0028774 A1* | 2/2003 | Meka | H04L 9/3231 713/176 |
| 2004/0088274 A1 | 5/2004 | Xu et al. | |
| 2004/0210607 A1* | 10/2004 | Manchanda | G06F 16/283 707/999.203 |
| 2005/0065986 A1* | 3/2005 | Bixby | G06F 16/128 |
| 2005/0066095 A1* | 3/2005 | Mullick | G06F 16/1774 710/200 |
| 2006/0004756 A1* | 1/2006 | Peleg | G06F 8/658 707/999.008 |
| 2006/0095763 A1* | 5/2006 | Iyengar | H04L 63/123 713/167 |
| 2006/0212462 A1* | 9/2006 | Heller | H04L 67/2852 709/236 |
| 2007/0220260 A1* | 9/2007 | King | H04L 9/3247 713/176 |
| 2007/0220261 A1* | 9/2007 | Farrugia | G06F 16/2255 713/176 |
| 2007/0240217 A1* | 10/2007 | Tuvell | G06F 21/56 726/24 |
| 2008/0005195 A1* | 1/2008 | Li | G06F 16/1837 707/999.203 |
| 2008/0133622 A1* | 6/2008 | Brown | G06F 11/1458 |
| 2008/0133922 A1* | 6/2008 | Williams | H04L 9/3247 713/176 |
| 2008/0162589 A1* | 7/2008 | Rodeheffer | G06F 11/1469 |
| 2008/0235479 A1* | 9/2008 | Scales | G06F 3/0608 711/166 |
| 2008/0269918 A1* | 10/2008 | Piacibello | G06F 11/1441 714/E11.138 |
| 2009/0144342 A1* | 6/2009 | Sudhakar | G06F 16/1873 707/999.203 |
| 2010/0011060 A1* | 1/2010 | Hilterbrand | G06F 8/65 709/204 |
| 2010/0070725 A1* | 3/2010 | Prahlad | G06F 11/1469 718/1 |
| 2010/0088278 A1* | 4/2010 | Wood | G01R 31/31835 707/638 |
| 2010/0125733 A1* | 5/2010 | Kim | H04L 9/3273 713/169 |
| 2010/0174761 A1* | 7/2010 | Longobardi | G06Q 10/107 707/821 |
| 2011/0078791 A1* | 3/2011 | Prakash | G06F 21/567 726/22 |
| 2011/0270959 A1* | 11/2011 | Schlusser | H04L 67/42 709/223 |
| 2012/0011102 A1* | 1/2012 | Borden | G06F 16/182 707/654 |
| 2012/0036400 A1* | 2/2012 | Miller | G06F 11/10 714/54 |
| 2012/0159289 A1* | 6/2012 | Piccirillo | G06F 11/1441 714/799 |
| 2012/0246442 A1* | 9/2012 | Dolgunov | G06F 21/57 711/E12.078 |
| 2012/0290926 A1* | 11/2012 | Kapadia | G06F 40/166 715/255 |
| 2012/0296878 A1* | 11/2012 | Nakae | G06F 21/64 707/690 |
| 2012/0330887 A1* | 12/2012 | Young | G06F 16/40 707/610 |
| 2014/0032833 A1* | 1/2014 | Cudak | G06F 3/0652 711/E12.001 |
| 2014/0059094 A1* | 2/2014 | Shankar | G06F 16/13 707/827 |
| 2014/0122862 A1* | 5/2014 | Ludwig | G06F 8/65 713/100 |
| 2014/0215028 A1* | 7/2014 | Donner | H04L 41/0886 709/220 |
| 2014/0379671 A1 | 12/2014 | Barrus et al. | |
| 2015/0018000 A1* | 1/2015 | Zhao | H04W 24/02 455/452.1 |
| 2015/0242478 A1 | 8/2015 | Cantwell et al. | |
| 2015/0331687 A1* | 11/2015 | Groover | G06F 9/44536 717/168 |
| 2015/0355900 A1* | 12/2015 | Crosby | G06F 8/654 717/168 |
| 2016/0019296 A1* | 1/2016 | Sullivan | G06Q 10/087 707/770 |
| 2016/0085618 A1* | 3/2016 | Mackay | G06F 11/1004 714/807 |
| 2016/0140141 A1* | 5/2016 | Darcy | G06F 16/137 707/827 |
| 2016/0182237 A1* | 6/2016 | Almgren | G06F 11/1451 713/155 |
| 2016/0224404 A1* | 8/2016 | Mehta | G06F 21/575 |
| 2016/0248591 A1* | 8/2016 | Choi | G06F 21/572 |
| 2016/0292203 A1* | 10/2016 | Tsujikawa | G06F 16/2358 |
| 2017/0054736 A1* | 2/2017 | Krishnamurthy | G06F 21/6209 |
| 2017/0068530 A1* | 3/2017 | Berrange | H04L 67/34 |
| 2017/0169069 A1* | 6/2017 | Manjunath | G06F 16/2365 |

OTHER PUBLICATIONS

Tolia, "Opportunistic Use of Content Addressable Storage for Distributed File Systems", <netsec.ethz.ch/publications/papers/usenix03.pdf>, Intel Research Pittsburgh; Carnegie Mellon University; Denison University, ***.

Weil, "Ceph: A Scalable, High-Performance Distributed File System", <ceph.com/papers/weil-ceph-osdi06.pdf>, University of California, Santa Cruz, published on 2006.

Giuseppe, "Dynamo: Amazon's Highly Available Key-Value Store", <allthingsdistributed.com/files/amazon-dynamo-sosp2007.pdf>, Amazon.com, Oct. 14-17, 2007.

* cited by examiner

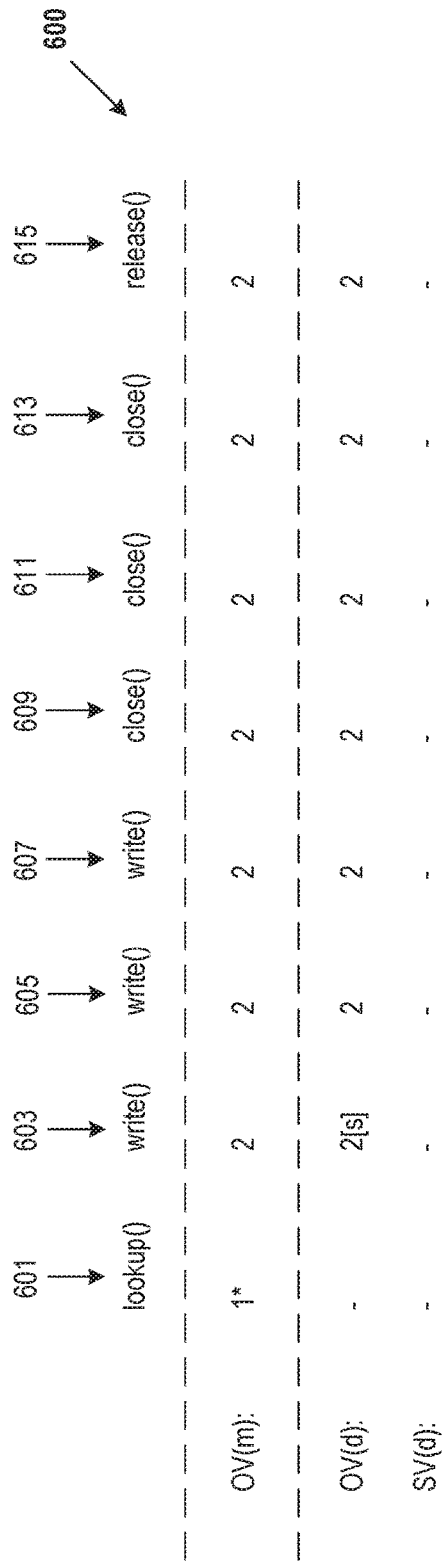
FIG. 6
FIG. 7
FIG. 8

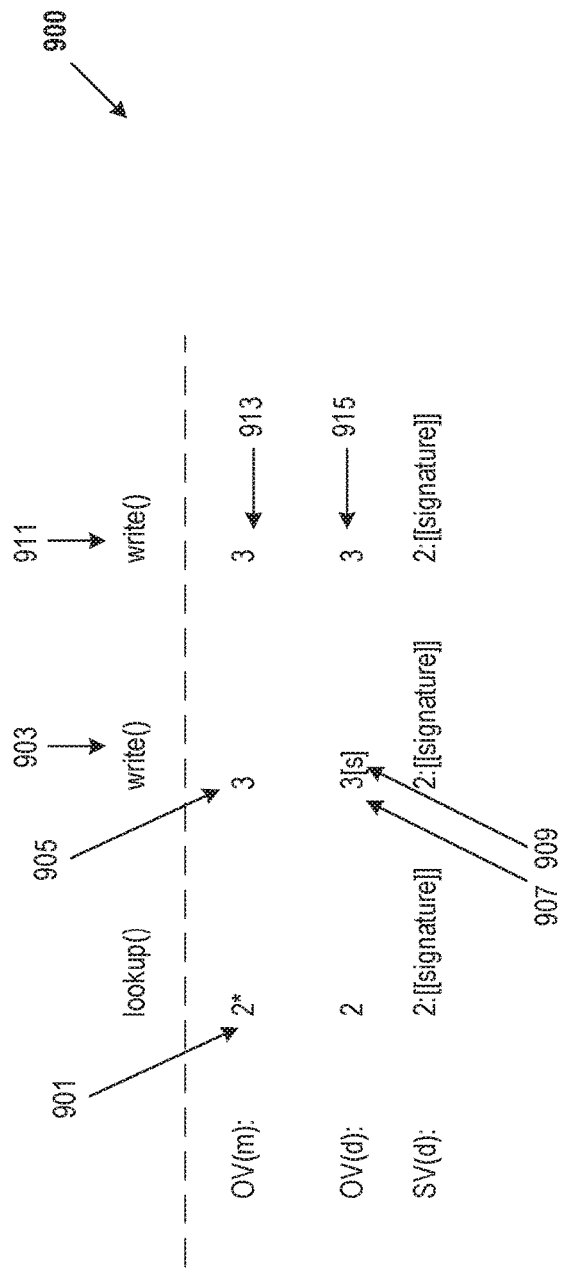
FIG. 9
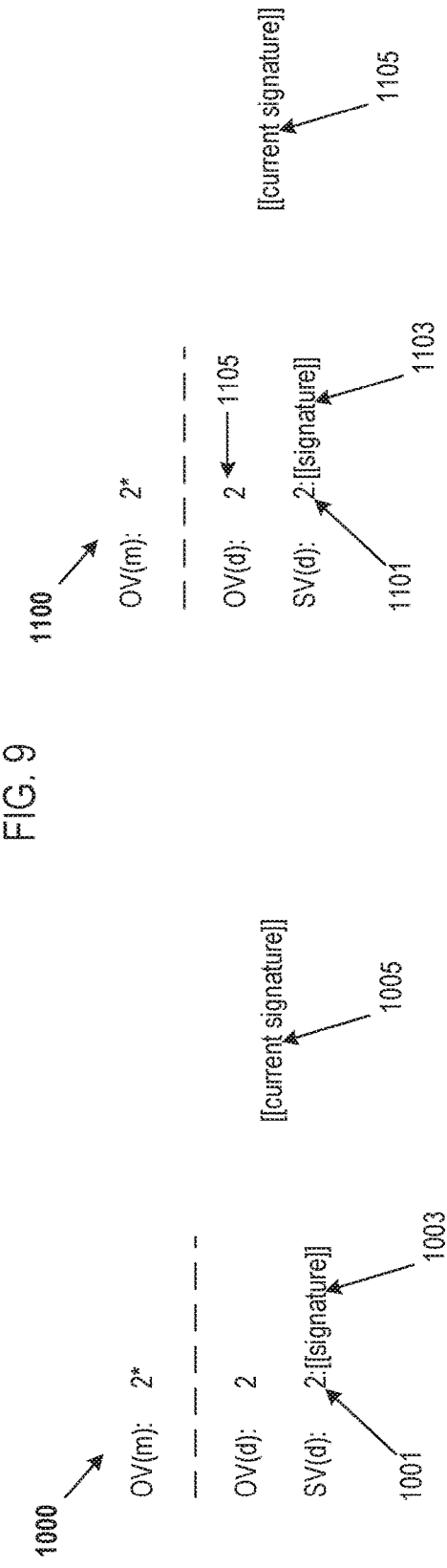
FIG. 11
FIG. 10

US 11,386,067 B2

DATA INTEGRITY CHECKING IN A DISTRIBUTED FILESYSTEM USING OBJECT VERSIONING

RELATED APPLICATIONS

This application claims the benefit of U.S. Provisional Patent Application 62/267,576, filed on Dec. 15, 2015, which is incorporated herein by reference.

TECHNICAL FIELD

The present disclosure relates to data integrity, and more particularly, to data integrity checking in a distributed filesystem using object versioning.

BACKGROUND

The performance and integrity of data stored on storage media (e.g., disk) may deteriorate over time and/or by user interaction. In a distributed filesystem, which is built on top of a local filesystem, there is a chance of data corruption not only due to disk, but also due to malicious acts by people. The first type of data corruption, which is attributed to the disk itself when the data and the disk age over time, is sometimes referred to as "bit rot" or "bit flip", where the one or more data bits on a disk get flipped. Data typically consists of bits of values of zeros and ones and may be stored on the disk and accessed from the disk over decades of time. There may be firmware bugs and/or mechanical wear and tear of the disk that may cause the data to be in a corrupted state. A bit that has a value of zero may be flipped to a value of one or vice versa. The traditional operating system of the disk drive can detect a bad sector of the disk drive, but typically does not detect bit rot and/or bit flip errors. Conventional disk drives cannot detect bit rot and/or bit flip errors, and if the data, which contains a bit rot error and/or bit flip error is requested, the conventional disk drive serves the corrupt data to the requester.

The second type of data corruption generally involves a distributed filesystem that is built on a local filesystem. With a distributed filesystem that is built on top local filesystem, typically, there are no constraints to prevent administrators or other users from editing data using the underlying filesystem directly. The edits made directly using the underlying filesystem may corrupt the data unbeknown to the distributed filesystem. Traditional data integrity checking tools of a distributed filesystem cannot detect that data is corrupt when changes are made to the data using an underlying filesystem because the distributed filesystem is unaware of the edits being made to the data.

Some traditional data integrity checking tools may perform inline check sum operations to check the integrity of the data, which at times have been inefficient for being resource intensive and time consuming operations depending on the amount of data being checked. Traditional data integrity checking tools for filesystem generally are not capable of detecting both data corruption due to disk wear and tear and data corruption due to a user editing the data.

BRIEF DESCRIPTION OF THE DRAWINGS

The present disclosure will be understood more fully from the detailed description given below and from the accompanying drawings of various implementations of the disclosure.

FIG. 6 is an example state diagram illustrating object versioning for data integrity checking, in accordance with one or more implementations of the present disclosure.

FIG. 7 is an example state diagram illustrating a state of an object for data integrity checking before the object is signed, in accordance with one or more implementations of the present disclosure.

FIG. 8 is an example state diagram illustrating a state of an object for data integrity checking when the object is signed, in accordance with one or more implementations of the present disclosure.

FIG. 9 is an example state diagram illustrating object versioning for data integrity checking when detecting that an object is under modification, in accordance with one or more implementations of the present disclosure.

FIG. 10 is an example state diagram illustrating object versioning for data integrity checking when detecting object data that is valid, in accordance with one or more implementations of the present disclosure.

FIG. 11 is an example state diagram illustrating object versioning for data integrity checking when detecting object data that is corrupt, in accordance with one or more implementations of the present disclosure.

DETAILED DESCRIPTION

Implementations of the present disclosure describe data integrity checking in a distributed filesystem using object versioning. A filesystem can be used to control how data is stored and retrieved. Data can be stored in a filesystem as an object. The object can be a file or a directory. A distributed filesystem is a filesystem that allows access to objects (e.g., files) from multiple hosts and allows multiple users on multiple machines to share the objects. A distributed filesystem can be built on top of an underlying local filesystem.

Filesystems and distributed filesystems can store data as a large number of objects. The object data may be stored on storage devices, such as hard disk drives (hereinafter referred to as "disk"). The data of the objects may become corrupt, for example, due to disk wear and tear, and/or changes made to the data using the underlying local filesystem unbeknown to the distributed filesystem. Implementations of the present disclosure use object versioning to detect data corruption due to either a user editing the data using an underlying filesystem or disk wear and tear. Compared to traditional data integrity checking solutions, implementations of the present disclosure reduce the time and resources used to perform data integrity operations by distinguishing between data that is under modification, which should not be reviewed, and data that is not under modification and should be reviewed.

Figure 1:
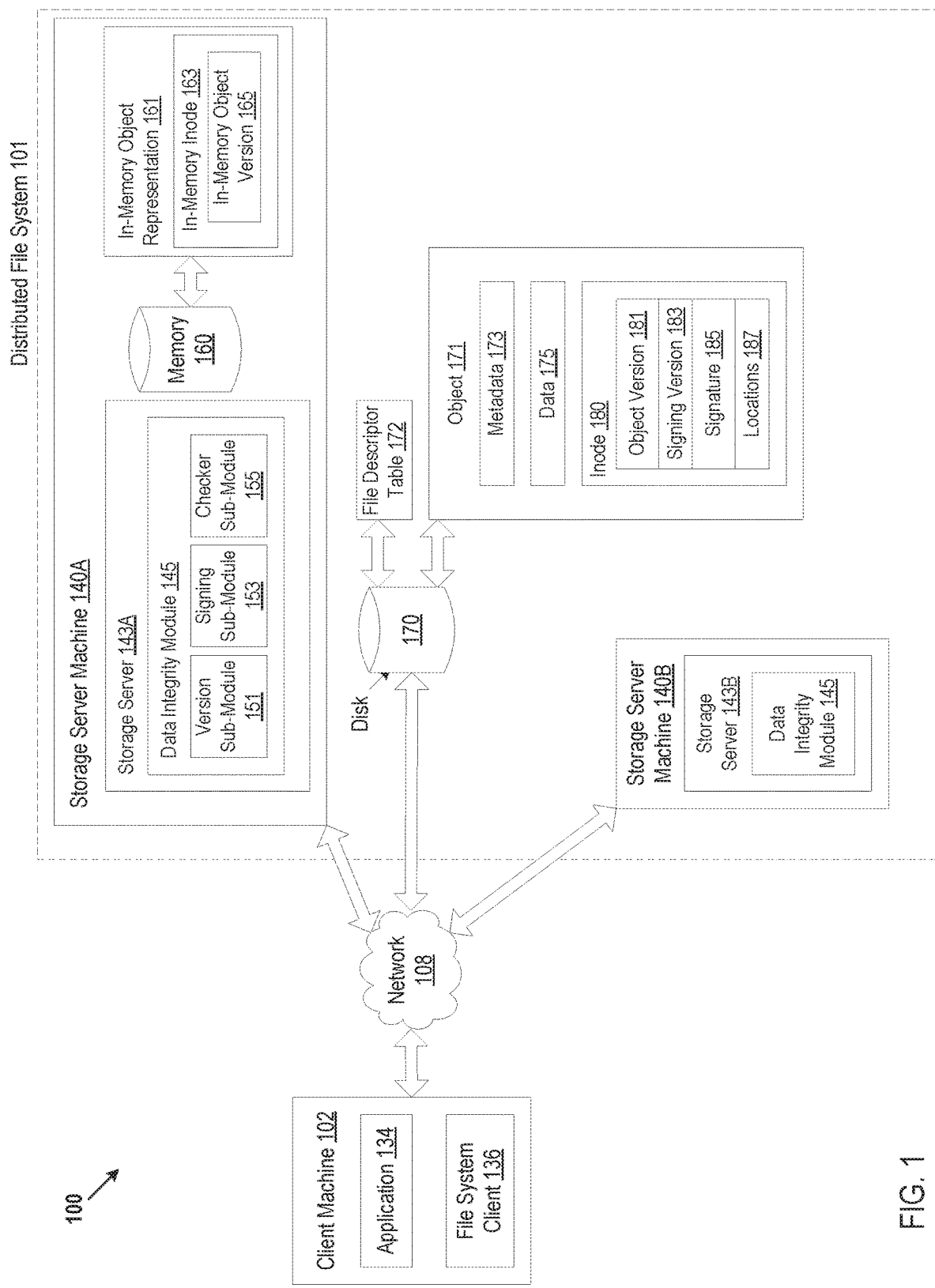
FIG. 1 is an example system architecture in which implementations of the present disclosure can be implemented.

FIG. 1 is an example system architecture 100 for various implementations. The system architecture 100 can include a distributed filesystem 101 coupled to one or more client machines 102 via a network 108. The network 108 may be a public network, a private network, or a combination thereof. Network 108 can include a wireless infrastructure. The wireless infrastructure may be provided by one or multiple wireless communications systems, such as a wireless fidelity (WiFi) hotspot connected with the network 108 and/or a wireless carrier system that can be implemented using various data processing equipment, communication towers, etc.

System architecture 100 includes a distributed filesystem 101 that is built on top of a local filesystem. The distributed filesystem 101 can be used on one or more types of data stores. The data stores can be persistent storage units. The persistent storage units can be local storage units and/or remote storage units. Persistent storage units can be hard disk drives ("disk"), magnetic storage units, optical storage units, solid state storage units, electronic storage units (main memory), or similar storage units. Persistent storage units can be a monolithic device or a distributed set of devices. A 'set', as used herein, refers to any positive whole number of items. Hard disk drives (e.g., disk 170) is used as an example of a data store throughout this document.

The distributed filesystem 101 can be installed on multiple servers (e.g., storage servers 143A,143B) and clients (e.g., client machine 102), and can span multiple disks (e.g., disk 170) to store the data of the objects. The distributed filesystem 101 can be a network attached storage filesystem that includes one or more storage server machines 140A, 140B and one or more disks (e.g., disk 170) coupled to the storage server machines 140A,140B via the network 108. A storage server machine 140A,140B can include a network-accessible server-based functionality (e.g., storage server 143A,143B) or other data processing equipment. The storage server machines 140A,140B can include, and are not limited to, any data processing device, such as a desktop computer, a laptop computer, a mainframe computer, a personal digital assistant, a server computer, a handheld device or any other device configured to process data.

The distributed filesystem 101 can store data as objects (e.g., object 171), which can be files and/or directories on disks (e.g., disk 170). An object 171 of the distributed filesystem 102 can be stored as two different parts on the disk 170: (1) the data blocks that include the data 175 of the object 171 and (2) the inode 180 for the object 171. The information about the object 171 is stored in the inode 180. The inode 180 is a data structure that can include the locations 187 of the data blocks that store the data 175 of the object 171. Modes (e.g., inode 180) and data blocks of data 175 are stored on disks (e.g., disk 170) in the distributed filesystem 101.

One or more client machines 102 can include a filesystem client 136 to communicate with the storage servers 143A.143B in the filesystem 101 to access the objects. The client machines 102 can host one or more applications 134. An application 134 can be any type of application including, for example, a web application, a desktop application, a browser application, etc. An application 134 may request access (e.g., read, write, etc.) to the data of an object (e.g., object 171) in the distributed filesystem 101 via the filesystem client 136. A client machine 102 may a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like.

When an operation (e.g., read, write, truncate, delete, etc.) is performed on an object 171, for example, via a filesystem client 136, a storage server (e.g., storage server 143A) can read the inode 180 for the object 171 from disk 170 into local memory (memory 160) of the storage server 143A to create an in-memory object representation 161 of the object 171. The in-memory object representation 161 in memory 160 can include an in-memory inode 163.

In a distributed filesystem 101, which is built on top of a local filesystem, there is a chance of data corruption of an object 171 not only due to disk 170 wear and tear, but also due to changes that are made to the data 175 of the object 171 using the local filesystem unbeknown to the distributed filesystem 101. The type of data corruption, which is attributed to the wear and tear of disk 170 itself, is sometimes referred to as "bit rot" or "bit flip", where one or more data bits on a disk 170 get flipped. Data 175 typically consists of bits of values of zeros and ones and may be stored on the disk 170 and accessed from the disk 170 over decades of time. A bit that has a value of zero may be flipped to a value of one or vice versa. Another type of data corruption generally involves the distributed filesystem 101 being built on a local filesystem. With a distributed filesystem 101, typically, there are no constraints to prevent administrators or other users from editing object data 175 using the underlying filesystem directly. The edits made directly using the underlying filesystem may corrupt the data 175 of an object 171 unbeknown to the distributed filesystem 101. Traditional data integrity checking tools of a distributed filesystem generally cannot detect that object data is corrupt due to changes that are made to the data using an underlying filesystem because the distributed filesystem is unaware of the edits being made to the data.

System architecture 100 can include a data integrity module 145 to check whether the data (e.g., data 175) of the objects (e.g., object 171) in the distributed filesystem 101 are corrupt or valid. The data 175 of an object 171 is considered valid by the data integrity module 145 when the object 171 has passed the data integrity analysis performed by the data integrity module 145.

The data integrity module 145 can include a version sub-module 151 to assign and update versions to the objects. There are two types of versions that are being are tracked by the data integrity module 145 for an object: (1) an object version 181 and (2) a signing version 183. An object version 181 is assigned to an object 171 and/or updated for an object 171 when an operation is performed to modify the object 171. Modifying can object can include, and is not limited to, writing data to an object and truncating data of an object. There are two types of object versions: (1) an in-memory object version 165 and (2) an on-disk object version 181. The in-memory object version 165 can be stored in the in-memory mode 163. The on-disk object version 181 can be stored in an extended attribute of the on-disk mode 180.

The signing version 183 of the object 171 represents the in-memory object version 165 of the data 175 that was used to create a signature 185. The signing version 183 is described in greater detail below in conjunction with the signing sub-module 153.

In one example, the storage server 147A may create a new object 171 (e.g., file), and the version sub-module 151 can assign a starting value of "1" as the in-memory object version 165 for the object 171. The version sub-module 151 can synchronize the value of the on-disk object version 181 to match the value (e.g., "1") of the in-memory object version 165 to make the value of the in-memory object version 165 persistent. When a write operation is performed on the object 171, the version sub-module 151 can increment the value of the in-memory object version 165, for example from "1" to "2", and can synchronize the value of the on-disk object version 181 to match the updated value (e.g., "2") of the in-memory object version 165. In one implementation, the version sub-module 151 is optimized such that not every operation that is performed to modify an object 171 triggers the object version (e.g., in-memory object version 165, on-disk object version 181) to be incremented. An object 171 can be marked as a candidate version updating. For example, a flag of an in-memory inode 163 for an object 171 can be set to mark the object 171 as a candidate for version updating. The in-memory inode 163 can include one or more bits that can be used as flags. Triggering the updating of an object version is described in greater detail below in conjunction with FIG. 3 and FIG. 4.

The data integrity module 145 can include a signing sub-module 153 to create signatures (e.g., signature 185) and signing versions (e.g., signing version 183) for the objects (e.g., object 171). In one implementation, the signing sub-module 153 is executed as a background process on a storage server (e.g., storage server 143A). The signing sub-module 153 can create a signature 185 for an object 171 using the data 175 and/or metadata 173 of the object 171 as input to a hash function. Configuration data that is stored in a data store can indicate which hash function should be used. For example, the hash function for creating an object's signature 185 may be the SHA-256 hash function to generate a 256-bit hash as a signature 185 for the object 171. The signing sub-module 153 can associate the signature 185 with the particular in-memory object version 165 of the object 171 that was used to generate the signature 185. The signing sub-module 153 uses the value of the in-memory object version 165 of the object 171 that was used to generate the signature 185 as the value for the signing version 183. The value of the signing version 183 can be stored in an extended attribute of the on-disk inode 180. For example, if the signing sub-module 153 uses data 175 of the object 171 that has an in-memory object version 165 value of "2" to generate a particular signature 185, then the signing sub-module 153 can store a value of "2" as the value for the signing version 183 to represent which version of data 175 was used to generate the signature 185.

The signing sub-module 153 can create the signature 185 for an object 171 when one or more criteria is met. The criteria can be configurable, user-defined, and stored on a data store as part of configuration data. The criteria can include, for example, that when the last open file descriptor for the object 171 is closed the object 171 becomes a candidate for signing, and/or that the signing sub-module 153 should wait a time period (e.g., 120 seconds) before creating the signature 185 for an object 171.

When an object 171 (e.g., file) is opened, the associated storage server 143A,143B can create an open file descriptor (fd) for the open object 171. A file descriptor can be an index for an entry in a kernel-resident data structure containing the details of the open object 171 (e.g., open file) associated with the machine (e.g., storage server machine 140A). In POSIX (portable operating system interface) the data structure may be a file descriptor table 172. Each storage server 143A,143B can have its own file descriptor table for open objects. For example, the storage server 143A can store a file descriptor table 172 that includes a file descriptor for object 171 that has been opened, for example, for a client application 134 via the filesystem client 136. A file descriptor can be an abstract indicator for accessing an object (e.g., object 171). File descriptors can be small integers corresponding to an object (e.g., object 171) that has been opened for a process (e.g., client application 134).

Each time an operation for modifying the object 171 is performed, the storage server 143A can add a file descriptor entry to the file descriptor table 172. For example, the same object 171 may be opened by ten users via multiple client machines 105 and filesystem clients 136 for various write operations, and the file descriptor table 172 can maintain an entry for each write operation. In one implementation, when a respective write operation is complete, the storage server 143A can perform a close operation and/or release operation. The corresponding file descriptor in the file descriptor table 172 is closed such that the entry for the file descriptor in the file descriptor table 172 is removed.

The signing sub-module 153 can monitor the file descriptor table 172. When the file descriptor table 172 no longer contains any file descriptors for a particular object 171, the signing sub-module 153 can determine that the object 171 is no longer under modification and is a candidate for signing. Before the signing sub-module 153 creates a signature for the object 171, the signing sub-module 153 can mark the object 171 to indicate to the version sub-module 151 that the version sub-module 151 should update the object versions (e.g., in-memory object version 165, on-disk object version 181) of the object 171 when a subsequent modification is made to the object 171. The marking of the object 171 can make the object 171 a candidate for version incrementation. The signing sub-module 153 can set a flag in the in-memory inode 163. A signature 185 and a corresponding signing version 183 can be stored in the extended attributes of the on-disk inode 180 in persistent storage (e.g., disk).

The data integrity module 145 can include a checker sub-module 155 to use the versions (e.g., on-disk object version 181, on-disk signing version 181, in-memory object version 165) and signatures (e.g., signature 185) of the respective object 171 to determine whether the data 175 of the object 171 is valid or corrupt. In one implementation, the checker sub-module 155 is executed as a background process on a storage server (e.g., storage server 143A).

The checker sub-module 155 can scan the objects (e.g., object 171) and use the object versions 165,181 to determine whether an object is a candidate for a data integrity check. The checker sub-module 155 can scan the objects (e.g., object 171) based on a time interval (e.g., hourly, daily, weekly) and/or a schedule for data integrity checking. The time interval and/or schedule can be configurable and/or user-defined. Some of the objects may be under modification, and the checker sub-module 155 can skip analysis of these particular objects. The checker sub-module 155 can use object versioning to differentiate between an object 171 which is under modification by one or more I/O (input/output) operations, which is a legitimate case, and an object 171 that may have corrupt data.

The checker sub-module 155 can use the on-disk object version 181 of a respective object 171 and a signature 185 of the object 171 to determine whether the object is under modification. The current object version 181 may not match the signing version 183. For example, the data 175 of the object 171 may be modified and the on-disk object version 181 may be updated from "2" to "3". The signing version 183 may remain at version "2" until a new signature 185 is created using the modified object data 175. The mismatch of the on-disk object version 181 and the signing version 183 can indicate to the checker sub-module 155 that the object 171 is under modification.

An object 171 that is not under modification is a candidate for a data integrity check, and the checker sub-module 155 can use the object versions 165,181 and signatures (e.g., signature 185) to determine whether the data 175 of the object 171 is valid or corrupt. Data integrity checking of an object by the checker sub-module 155 using object versions 165,181 and signatures is described in greater detail below in conjunction with FIG. 2.

For example, if a client machine 102 is writing data to an object 171, the object versions 165,181 for the object 171 would be incremented, for example, from "V" to "V+1". The signing version 183 for the object 171 may be "V". When the checker sub-module 155 compares either the in-memory object version 165 "V+1" or the on-disk object version 181 "V+1" to the signing version 183 "V", the checker sub-module 155 determines that the versions are not equal, which indicates that the object 171 is under modification. If the checker sub-module 155 were to calculate a current signature, the current signature would not match the signature 185 that is stored on disk 170 because the data 175 of the object 171 is being modified and is different from the version of data 175 that was used to create the signature 185 that is stored on disk 170.

In another example, the object 171 may not be under modification, and the object versions 165,181 would be, for example, "V". The checker sub-module 155 can produce a current signature using data 175 of the object as input to a specified hash function and compare the current signature to the signature 185 that is stored on disk 170. The type of input (e.g., data of an object) and the hash function used by the checker sub-module 155 should be the same as the type of input and the hash function used by the signing sub-module 153. If the data 175 is not corrupt, the current signature should match the signature 185 that is stored on disk 170 because the data 175 of the object would not have changed and the current calculated signature (e.g., hash) should match the stored signature 185 (e.g., hash).

Figure 2:
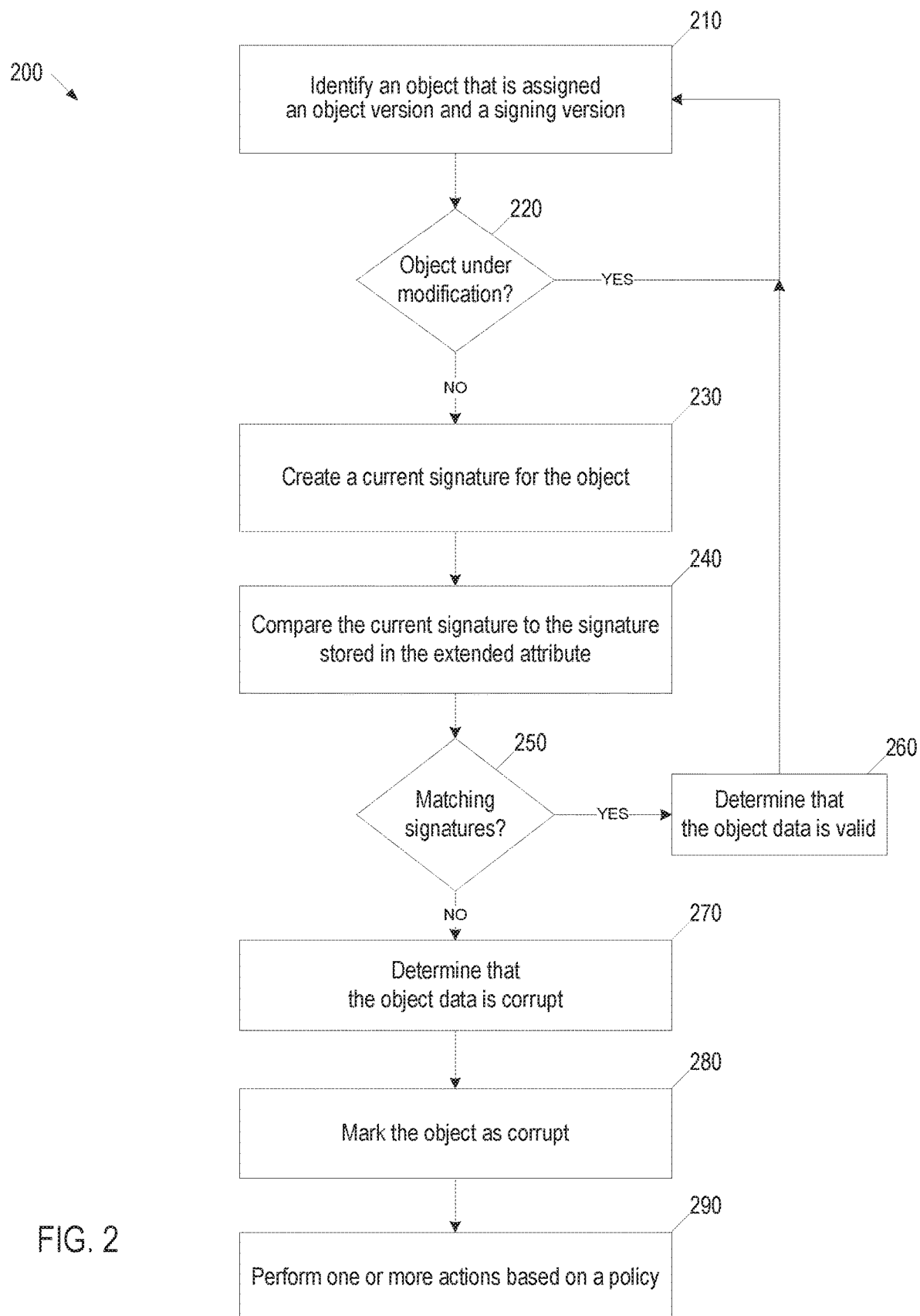
FIG. 2 is a flow diagram for a method for using object versioning for data integrity checking, in accordance with one or more implementations of the present disclosure. Method

FIG. 2 is a flow diagram for a method 200 for using object versioning for data integrity checking, in accordance with one or more implementations of the present disclosure. Method 200 can be performed by processing logic that can comprise hardware (e.g., circuitry, dedicated logic, programmable logic, microcode, etc.), software (e.g., instructions run on a processing device), or a combination thereof. In one implementation, method 200 is performed by a data integrity module (e.g., data integrity module 145 of FIG. 1) executed by a processing device in a computing machine. At least a portion of method 200 may be performed by one or more sub-modules (e.g., version sub-module 151, signing sub-module 153, and/or checker sub-module 155 in FIG. 1) of the data integrity module 145. At least a portion of method 200 can be performed automatically by the computing machine without user interaction.

At block 210, the processing device identifies an object that is assigned an object version and a signed version. The object representation (e.g., inode 180 in FIG. 1) in persistent storage (e.g., disk 170 in FIG. 1) can include one or more extended attributes that can store respective values for an on-disk object version (e.g., on-disk object version 181 in FIG. 1) and a signing version (e.g., signing version 183 in FIG. 1) that may be assigned to the object. The processing device can determine whether an object is assigned an object version and a signing version by examining the extended attributes of the inode in persistent storage for any version values. The assigning of an object version and a signing version to an object is described in greater detail below in conjunction with FIG. 3.

At block 220, the processing device determines whether the object is under modification. The processing device can compare the on-disk object version to the signed version in persistent storage to determine whether the object is under modification. If the on-disk object version does not match the signing version in persistent storage (block 220), the processing device determines that the object is under modification. For example, there may be one or more write operations being performed on the object. The processing device does not perform any further data integrity analysis of this particular object that is under modification and returns to block 210 to identify another object that is assigned an object version and a signing version.

If the on-disk object version matches the signing version in persistent storage (block 220), the processing device determines that the object is not under modification, and proceeds to analyze the object to determine whether the data of the object is corrupt or valid. At block 230, the processing device creates a current signature for the object. In one implementation, the processing device can use the data of the object as input to a hash function to generate a current signature for the object. In one implementation, the processing device can use the metadata of the object and the data of the object as input to the hash function to generate the signature.

At block 240, the processing device compares the current signature to the signature that is stored on persistent storage. The stored signature may be in an extended attribute of the object representation (e.g., inode) in persistent storage. At block 250, the processing device determines whether the current signature matches the stored signature for the object.

If the signatures match (block 250), the processing device determines that the object data is valid and passes the data integrity check at block 260, and returns to block 210 to identify another object that is assigned an object version and a signing version.

If the signatures do not match (block 250), the processing device determines that the object data is corrupt and does not pass the data integrity check at block 270. At block 280, the processing device marks the object as corrupt. The processing device can set a flag in the inode (e.g., on-disk inode) of the object to mark the object as corrupt. In one implementation, at block 290, the processing device performs one or more actions based on a policy. The actions can include, and are not limited to, sending a notification that the object data is corrupt, preventing access to the object, causing the corrupt data to be rectified, and/or causing the valid data to be recovered. The policy can be configurable and/or user-defined. The policy can be stored in a data store that is accessible to the processing device.

Figure 3:
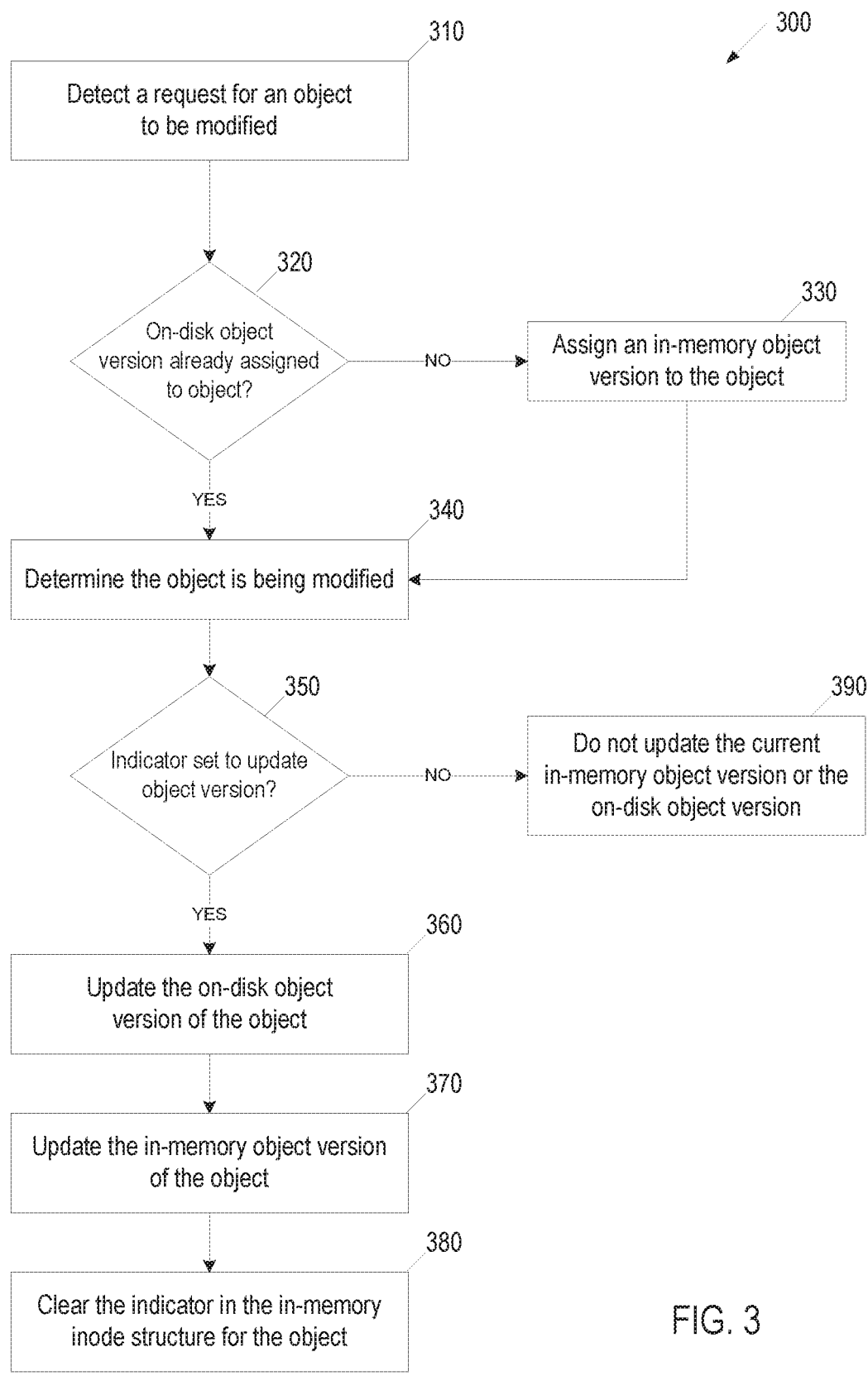
FIG. 3 is a flow diagram for a method for updating a version of an object for data integrity checking, in accordance with one or more implementations of the present disclosure.

FIG. 3 is a flow diagram for a method 300 for updating a version of an object for data integrity checking, in accordance with one or more implementations of the present disclosure. Method 300 can be performed by processing logic that can comprise hardware (e.g., circuitry, dedicated logic, programmable logic, microcode, etc.), software (e.g., instructions run on a processing device), or a combination thereof. In one implementation, method 300 is performed by a version module (e.g., version sub-module 151 of FIG. 1) executed by a processing device in a computing machine. At least a portion of method 300 can be performed automatically by the computing machine without user interaction.

At block 310, the processing device detects a request for an object to be modified. The processing device can detect the request for modifying the object by detecting a command (e.g., write command) and/or an operation (e.g., write operation) that is being performed to modify the object. The write operation and write command can be indications that there is a request to modify the object.

At block 320, the processing device determines whether an on-disk object version is already assigned to the object. The processing device can examine the extended attributes of the on-disk inode (e.g., inode 180 in FIG. 1) to determine whether an extended attribute contains a value for an object version (e.g., object version 181 in FIG. 1) for the object. The object may be a newly created object and is not yet assigned an on-disk object version, and there is not a value for the on-disk object version in the extended attributes of the on-disk inode. If the object is not assigned an on-disk object version (block 320), the processing device assigns an in-memory object version (e.g., in-memory object version 165 in FIG. 1) to the object.

At block 340, the processing device determines that the object is being modified. Modifying an object can include writing to the object, truncating the object, etc. In one example, the processing device can detect an open operation, a write operation, or a truncate operation to determine that the object is being modified. In another example, the processing device can detect a file descriptor for the object in a file descriptor table to determine that the object is being modified.

Upon determining that the object is being modified, at block 350, the processing device determines whether an indicator for the object is set to update the object version. For example, the processing device can determine whether a flag in the in-memory inode (e.g., in-memory inode 163 in FIG. 1) of the object is set. If the indicator (e.g., flag) is not set (block 350), the processing device does not update the current in-memory object version or the on-disk object version for the object. Not all operations that modify the object trigger updating the object versions of the object. The data integrity module (e.g., data integrity module 145 in FIG. 1) can strategically select which modification operations should trigger updating (e.g., incrementing) the object versions (e.g., in-memory object version, on-disk object version) for an object. For example, there may be five write operations being performed on the object, and the first of the five write operations may trigger the updating of the object versions. The subsequent four write operations may not cause the object versions to be updated (e.g., incremented). The trigger for updating the object versions can be based on configuration data. Strategic selection of which modification operations will trigger updating the object versions is described in greater detail below in conjunction with FIG. 4.

If the indicator (e.g., flag) is set (block 350), the processing device updates the on-disk object version of the object at block 360. For example, the processing device increments the value for the on-disk object version, which is stored in an extended attribute of the on-disk inode for the object, by a factor of one. The value of the on-disk object version can be incremented by any factor.

At block 370, the processing device updates the in-memory object version of the object. For example, the processing device increments the value for the in-memory object version, which is stored in the in-memory inode for the object, by a factor of one to match the on-disk object version. At block 380, the processing device clears the indicator for the object to indicate that the object version (e.g., in-memory object version, on-disk object version) is not to be updated by any subsequent modification operations made to the object.

Figure 4:
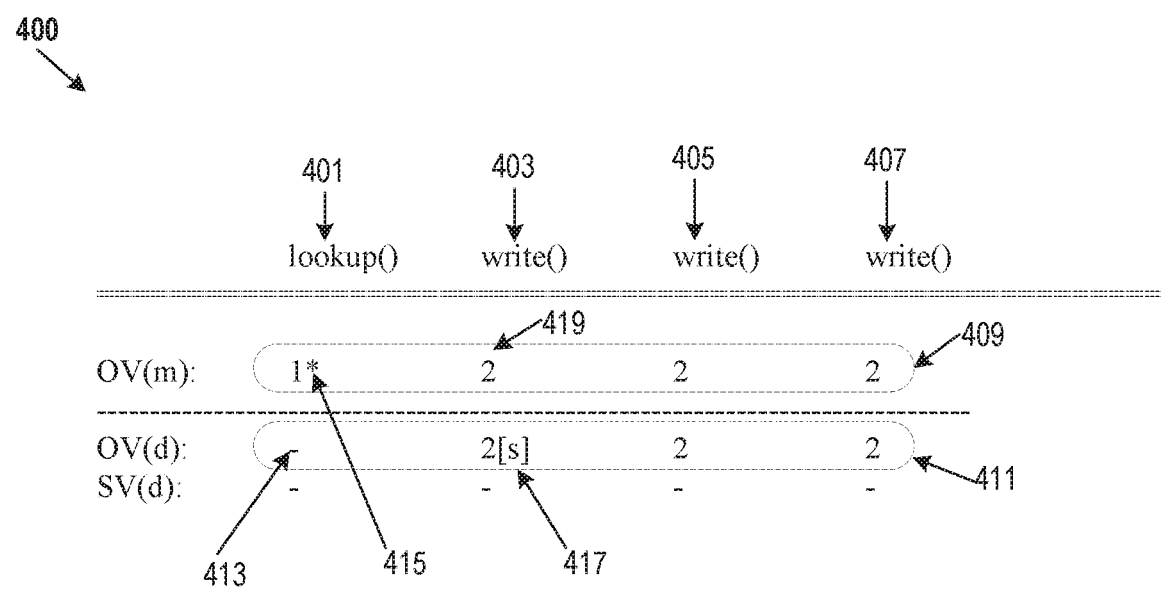
FIG. 4 is an example state diagram illustrating object versioning for data integrity checking, in accordance with one or more implementations of the present disclosure.

FIG. 4 is an example state diagram 400 illustrating object versioning for data integrity checking, in accordance with one or more implementations of the present disclosure. A sequence of operations (e.g., lookup, write, etc.) can be performed on an object. In one example, the state diagram 400 includes a list of the operations that are performed on the object in the order in which the operations are performed. For example, a lookup operation 401 may be performed on the object, followed by multiple write operations (e.g., write operation 403, write operation 405, write operation 407). Each write operation indicates that the data of the object is being modified, for example, by one or more users accessing the object via client machines (e.g., client machine 102 in FIG. 1) and filesystem clients (e.g., filesystem client 136 in FIG. 1).

The state diagram 400 includes sets 409,411 of values for two types of versions that are being are tracked by a data integrity (e.g., data integrity module 145 in FIG. 1) for the operations that are performed on an object: (1) an object version ("OV") and (2) a signing version ("SV(d)") (e.g., signing version 183 in FIG. 1). There are two types of object versions: (1) an in-memory object version ("OV(m)") (e.g., in-memory object version 165 in FIG. 1) and (2) an on-disk object version ("OV(d)") (e.g., on-disk object version 181 in FIG. 1). The signing version is described in greater detail below in conjunction with FIGS. 5-8, in accordance with various implementations.

In this example, an object is created, and a lookup operation 401 is performed. The object does not have an on-disk object version (OV(d)) assigned to it as indicated by the "-" character 413. Other characters, blank spaces, null value indicators can be used to indicate that a value is not assigned for a version (e.g., object version, signing version).

In one implementation, when a lookup operation 401 is performed on an object, which does not have an on-disk object version (OV(d)), a version module (e.g., version sub-module 151 in FIG. 1) can assign a default value of one ("1") for the in-memory object version (OV(m)) for the object.

The state diagram 400 illustrates, by use of a character, for example, an asterisk (e.g., "*") character 415, that the indicator (e.g., inode flag) is set to indicate that the object version of the object should be updated (e.g., incremented). The configuration data may specify that the incrementing of the object version should occur with the first write operation (e.g., write operation 403) that is performed following the lookup operation 401.

The version sub-module 151 can detect that the indicator (e.g., inode flag) is set and can detect the first write operation 503, and can update the in-memory object version OV(m), for example, by incrementing the value of in-memory object version OV(m) by a factor of one. In this example, the value of the in-memory object version OV(m) is incremented from 1 to 2. The value of the on-disk object version OV(d) can be synchronized to match the updated value (e.g., "2") of the in-memory version OV(m). The state diagram 400 illustrates the update of the on-disk object version OV(d) with "[s]" 417.

The version sub-module 151 can clear the indicator (e.g., inode flag) as illustrated with the lack of an asterisk (e.g., "*") character next to the value of "2" for the OV(m) for the first write operation 403. The clearing of the indicator prevents the subsequent write operations (e.g., write operation 405, write operation 407) to trigger the object version of the object to be updated.

Figure 5:
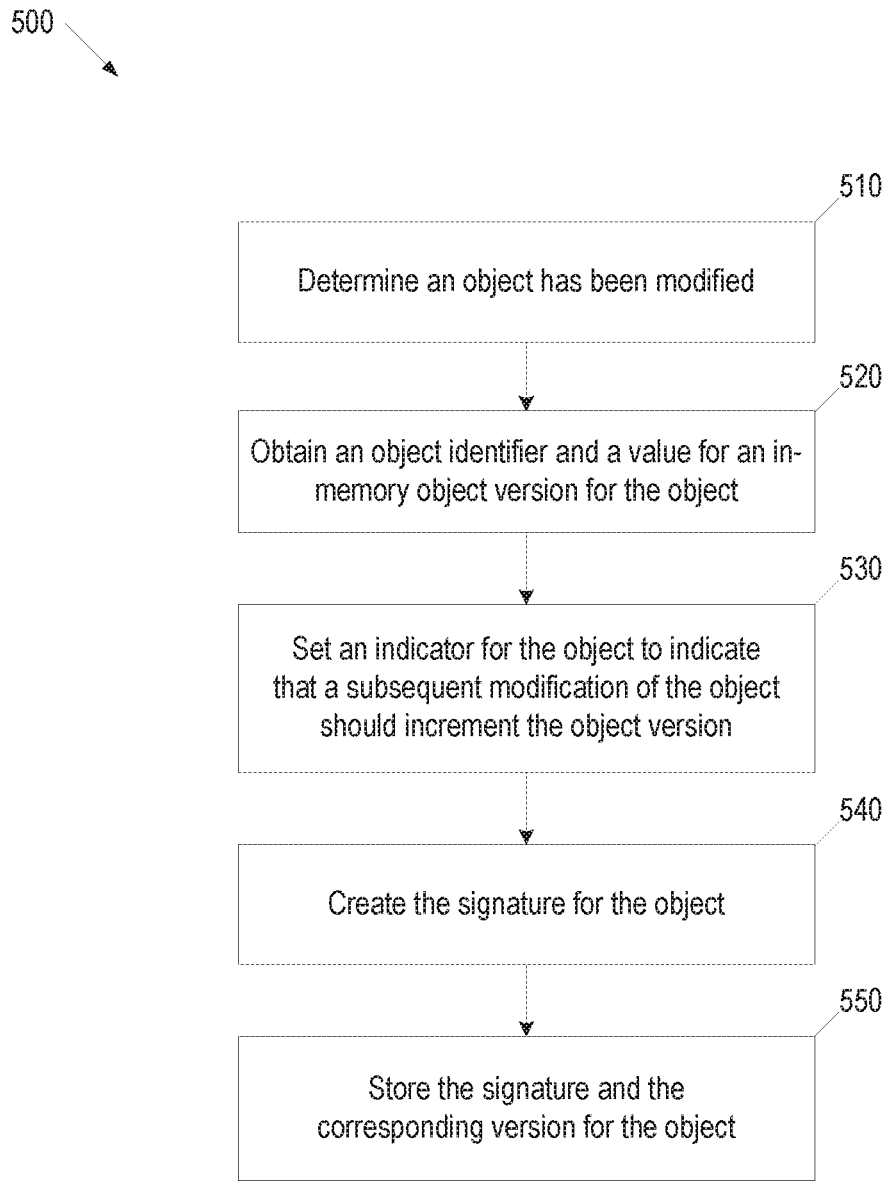
FIG. 5 is a flow diagram for a method for creating a signature for an object for data integrity checking, in accordance with one or more implementations of the present disclosure.

FIG. 5 is a flow diagram for a method 500 for creating a signature for an object for data integrity checking, in accordance with one or more implementations of the present disclosure. Method 500 can be performed by processing logic that can comprise hardware (e.g., circuitry, dedicated logic, programmable logic, microcode, etc.), software (e.g., instructions run on a processing device), or a combination thereof. In one implementation, method 500 is performed by a signing module (e.g., signing sub-module 153 of FIG. 1) executed by a processing device in a computing machine. At least a portion of method 500 can be performed automatically by the computing machine without user interaction.

At block 510, the processing device determines that an object have been modified. The processing device can from a file descriptor table (e.g., file descriptor table 172 in FIG. 1) that there are no open file descriptors for the object. At block 520, the processing device obtain an object identifier and a value for an in-memory object version for the object. The on-disk object version should be synchronized to match the in-memory object version. The processing device can confirm that the on-disk object version is synchronized to match the in-memory object version, for example, by detecting a synchronize indicator (e.g., "[s]") in the extended attribute of the on-disk inode, and can use the value for the on-disk object version as the value for the in-memory object version for the object. The processing device can obtain the object identifier from the on-disk inode.

At block 530, the processing device sets an indicator for the object to indicate that a subsequent modification of the object should increment the object version (e.g., in-memory object version, on-disk object version) is to be updated. The indicator can be a flag that is set in the in-memory inode (e.g., in-memory inode 163 in FIG. 1) of the object.

At block 540, the processing device creates the signature for the object. In one implementation, the processing devices waits for a period of time (e.g., 120 seconds) before creating the signature for the object. The time period can be configurable, user-defined, and stored in configuration data in a data store. The processing device can create a signature for an object using the data and/or metadata of the object as input to a hash function. The configuration data can indicate which hash function should be used. For example, the hash function may be SHA-256 to generate a 256-bit hash as a signature for the object.

At block 550, the processing device stores the signature and the corresponding version for object. The corresponding version for the object can be the value for the in-memory object version for when the signature was created. The corresponding version, which may be the value for the in-memory object version for when the signature was created, becomes the signing version (e.g., signing version 183 in FIG. 1) that represents which version of data of the object was used to create the signature. The processing device can store the signature and the corresponding value (e.g., signing version) for the in-memory object version in an extended attribute of the on-disk inode of the object.

FIG. 6 is an example state diagram 600 illustrating object versioning for data integrity checking, in accordance with one or more implementations of the present disclosure. A sequence of operations (e.g., lookup, write, close, release, etc.) can be performed on an object. In one example, the state diagram 600 includes a list of the operations that are performed on the object in the order in which the operations are performed. For example, a lookup operation 601 may be performed on the object, followed by multiple write operations (e.g., write operation 603, write operation 605, write operation 607). Each write operation indicates that the data of the object is being modified, for example, by one or more users accessing the object via client machines (e.g., client machine 102 in FIG. 1) and filesystem clients (e.g., filesystem client 136 in FIG. 1).

When operations (e.g., write operations) being performed on the object are complete, the distributed filesystem performs a close operation to close the file descriptor for the corresponding operation, which indicates that the object is not under modification by the respective operation. State diagram 600 illustrates three write operations (e.g., write operation 603, write operation 605, write operation 607).

The file descriptor table (e.g., file descriptor table 172 in FIG. 1) can include a file descriptor for each write operation. When an individual write operation is complete, the filesystem can perform a close operation to close the file descriptor that corresponds to the particular write operation. For example, there can be three close operations (e.g., close operation 609, close operation 611, close operation 613). When the three file descriptors in file descriptor table for the three write operations are closed, the object becomes a candidate for signing. In one implementation, the distributed filesystem performs one or more release operations (e.g., release operation 615) to release file descriptor(s).

FIG. 7 is an example state diagram 700 illustrating a state of an object for data integrity checking before the object is signed, in accordance with one or more implementations of the present disclosure. The state diagram 700 illustrates that the object does not have a signature or a signing version (SV(d)) by use of a dash "-" character 703. Other characters, blank spaces, null value indicators can be used to indicate that the object does not have a signature or a signing version.

Prior to creating a signature for the object, the signing sub-module 185 can mark the in-memory object version (OV(m)) to indicate that the object version for the object should be updated when a subsequent modification is made on the object. The signing sub-module 185 can set a flag in the in-memory mode. The state diagram 700 illustrates, by use of a character, for example, an asterisk (e.g., "*") character 701, that the signing sub-module 185 has set the indicator (e.g., inode flag) to indicate that the object version of the object should be updated (e.g., incremented) when a subsequent modification is made on the object. The set indicator can trigger the version sub-module 151 to update the object version of the object when a subsequent modification is made on the object, as described above in conjunction with FIG. 3.

FIG. 8 is an example state diagram 800 illustrating a state of an object for data integrity checking when the object is signed, in accordance with one or more implementations of the present disclosure. When the object becomes a candidate for signing, the signing sub-module 185 is informed that the object should be signed using a particular object version of the object data. The signing sub-module 185 can be notified of and/or can obtain the object identifier and the object version against which the signature should be attached to. The signing sub-module 185 can wait for a pre-defined interval (e.g., 120 seconds) before creating the signature of the object.

The signing sub-module 185 can calculate a hash as the signature 803 using the data and/or metadata for the particular version of the object data as input to a specified hash function. The hash function can be specified in configuration data. For example, the signing sub-module 185 may be notified that version "2" of the object data should be used to calculate the signature 803. When the signature 803 is generated, the signing sub-module 185 can execute a call to the distributed filesystem again to persist the signature 803 and the corresponding value 801 of the version used to create the signature 803 in an extended attribute of the on-disk inode of the object.

FIG. 9 is an example state diagram 900 illustrating object versioning for data integrity checking when detecting that an object is under modification, in accordance with one or more implementations of the present disclosure. The checker sub-module 155 is a component which proactively detects corrupted objects. The checker sub-module 155 can scan the distributed filesystem and verify the data integrity of individual objects. The checker sub-module 155 can calculate a signature (e.g., hash) for the object and compare the calculated signature with a stored signature for the object. The checker sub-module 155 can use object versioning to efficiently determine which objects are under modification and skip data integrity analysis for those particular object.

State diagram 900 illustrates the states of the object versions and signatures for an object that has been signed and is currently under modification. With a write operation 903, the version sub-module 151 updates (e.g., increments) the in-memory object version from a value of "2" 901 to "3" 905. With the write operation 903, the version sub-module 151 also increments the on-disk object version from a value of "2" to "3" 907. The synchronization of the object versions illustrated by "[s]" 909 in the state diagram 900.

With the write operation 903, the version sub-module 151 also clears an in-memory inode flag. The cleared inode flag is illustrated in state diagram 900 by lack of an asterisk character ("*") with the value of "3" 905 for the in-memory object version for write operation 903. With the flag cleared, a subsequent write operation 911 does not trigger the version sub-module 151 to increment the object versions. The values for the in-memory object version 913 and the on-disk object version 915 are maintained at the current value of "3". At this point, if the checker sub-module 155 detects this object, the checker sub-module 155 can determine that the mismatch of on-disk object version and the signed version is an indication that the object is under modification. In such a case, the checker sub-module 155 can skip the data integrity checking for this object and proceed, for example, on to another object.

FIG. 10 is an example state diagram 1000 illustrating object versioning for data integrity checking when detecting object data that is valid, in accordance with one or more implementations of the present disclosure. State diagram 1000 illustrates the states of the object versions and signatures for an object that has been signed and not under modification. If the data of the object is not corrupt, the current signature 1005 that is generated by the checker sub-module 155 should match the on-disk signature 1003 since the object data is not being modified and remains at version "2", which is the same version 1003 that is associated with the stored signature 1003. In this example, the checker sub-module 155 object determines that the object passes the data integrity check and has valid data.

FIG. 11 is an example state diagram 1100 illustrating object versioning for data integrity checking when detecting object data that is corrupt, in accordance with one or more implementations of the present disclosure. State diagram 1000 illustrates the states of the object versions and signatures for an object that has been signed, has corrupted data, and is not under modification. The checker sub-module 155 can detect the object, determine from the object versions of the object that the object is not under modification. The checker sub-module 155 can generate a current signature 1105 for the object using the current data of the object. In this example, the current data of the object is corrupt. For example, a change to the data may have been made using the underlying filesystem unbeknown to the distributed filesystem, the drive may be bad, or there may be a firmware bug to cause one or more data bits to be flipped from 0 to 1 or vice versa. As a result, when the checker sub-module 155 generates a current signature 1105 using the flipped bits, the current signature 1105 does not match the stored on-disk signature 1103. The checker sub-module 155 can determine that the value "2" 1105 of the on-disk object version matches the value "2" 1101 of the on-disk signing version, and the checker sub-module 155 can conclude that the signature mismatch is due to corrupted data of the object, and not due to active on-going data modification on the object. In this example, the checker sub-module 155 can mark the object as corrupted and further access to the object can be denied unless the corrupt data is rectified and/or the valid data is recovered.

Figure 12:
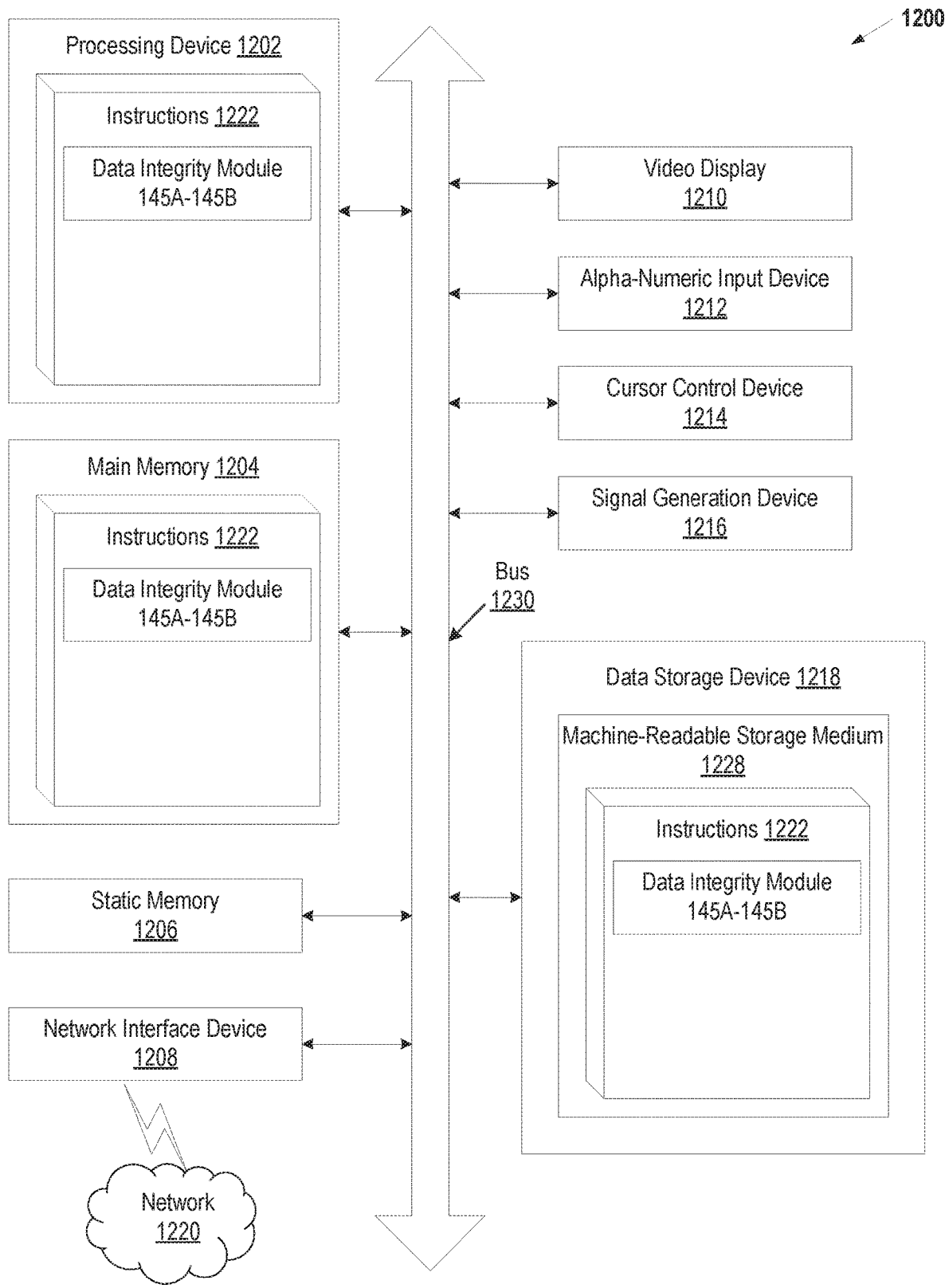
FIG. 12 is a block diagram of an example computer system that may perform one or more of the operations described herein.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 804 (e.g., read-only memory (ROM), flash memory, dynamic random access memory (DRAM) such as synchronous DRAM (SDRAM) or DRAM (RDRAM), etc.), a static memory 1206 (e.g., flash memory, static random access memory (SRAM), etc.), and a data store device 1218, which communicate with each other via a bus 1230.

Processing device 1202 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 1202 is configured to execute instructions 1222 for performing the operations and steps discussed herein.

The computer system 1200 may further include a network interface device 1208. The computer system 1200 also may include a video display unit 1210 (e.g., a liquid crystal display (LCD) or a cathode ray tube (CRT), an alphanumeric input device 1212 (e.g., a keyboard), a cursor control device 1214 (e.g., a mouse), and a signal generation device 1216 (e.g., speaker).

The data storage device 1218 may include a machine-readable storage medium 1228 (also known as a computer-readable medium) on which is stored one or more sets of instructions or software 1222 embodying any one or more of the methodologies or functions described herein. The instructions 1222 may also reside, completely or at least partially, within the main memory 1204 and/or within the processing device 1202 during execution thereof by the computer system 1200, the main memory 804 and the processing device 1202 also constituting machine-readable storage media.

In one implementation, the instructions 1222 include instructions for a data integrity module (e.g., data integrity module 143A-143B of FIG. 1), and/or a software library containing methods that call the data integrity module. While the machine-readable storage medium 1228 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "creating" or "performing" or "ignoring" or "marking" or "obtaining" or "assigning" or "setting" or "updating" or "clearing" or "incrementing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:

identifying an object that is associated with an object version indicating a modification operation that has been performed on the object, wherein the object is associated with a signing version having a corresponding first signature for the object, wherein the first signature is stored in a data store and is generated using at least one of data or metadata of the object associated with the first signature, and wherein the signing version of the object is stored in the data store;

obtaining an on-disk value of the object version stored in the data store, wherein the on-disk value of the object version has a numeric data type, and wherein the on-disk value of the object version is updated responsive to the modification operation performed on the object conditionally upon an increment indicator being set on the on-disk value of the object version;

obtaining a value of the signing version of the object stored in the data store, wherein the value of the signing version of the object has the numeric data type, and wherein the value of the signing version is updated responsive to a generation of the first signature of the object;

determining, by a processing device, whether the object is currently under modification, by comparing the on-disk value of the object version to the stored value of the signing version of the object; and responsive to determining that the on-disk value of the object version does not match the stored value of the signing version:

determining that the object is currently under modification, and excluding the object from a data integrity analysis, wherein a performing of the data integrity analysis on the object comprises creating a second signature for the object using the data of the object.

2. The method of claim 1, further comprising:

responsive to determining that the on-disk value of the object version matches the value of the signing version:

determining that the object is not under modification; and performing the data integrity analysis on the data of the object by:

creating a second signature for the object using the data of the object; and determining whether the first signature matches the second signature.

3. The method of claim 2, further comprising:

marking the data of the object as corrupt, responsive to a determination that the first signature does not match the second signature.

4. The method of claim 2, further comprising:

performing an action pertaining to the data of the object, responsive to a determination that the first signature does not match the second signature.

5. The method of claim 1, wherein the object version and the signing version are stored in one or more extended attributes of an inode of the object.

6. The method of claim 1, wherein the first signature is created in response to determining a file descriptor table for the object does not contain a file descriptor, wherein the file descriptor table not containing a file descriptor indicates that the object is not under modification.

7. A non-transitory computer-readable storage medium including instructions that, when executed by a processing device, cause the processing device to:

obtain an object version of an object being modified from a data store, wherein the object version corresponds to an on-disk object version of the object, wherein the on-disk value of the object version has a numeric data type, and wherein the on-disk value of the object version is updated responsive to modifications performed on the object conditionally upon an increment indicator being set on the on-disk value of the object version;

create a signature for the object using the object;

assign a signing version to the object, the signing version representing a value of the object version when the signature for the object is created, wherein the value of the signing version of the object has the numeric data type, and wherein the value of the signing version is updated responsive to generation of signatures of the object;

mark, by the processing device, before assigning the signing version of the object, the object as a candidate for version incrementation to indicate that the object version of the object is to be updated responsive to a subsequent modification made to the object; and perform a data integrity analysis on the object responsive to determining that the signing version of the object and the on-disk object version of the object match.

8. The non-transitory computer-readable storage medium of claim 7, wherein to determine the version of the data of the object, the processing device is to:

obtain a value for an on-disk object version stored in a data store; and assign the value of the on-disk object version as a value for the version of the data of the object.

9. The non-transitory computer-readable storage medium of claim 7, wherein to mark the object as a candidate for version incrementation, the processing device is to:

set a flag in an in-memory inode of the object.

10. The non-transitory computer-readable storage medium of claim 7, wherein to create the signature for the object, the processing device is to:

create the signature after a period of time has elapsed.

11. The non-transitory computer-readable storage medium of claim 7, wherein the signature is created using at least one of the data or metadata of the object.

12. The non-transitory computer-readable storage medium of claim 7, wherein to perform the data integrity analysis, the processing device is to:

determine whether the object is under modification;

create another signature for the object using data of the object, responsive to a determination that the object is not under modification; and perform the data integrity analysis on the data of the object by determining whether the signature matches the other signature.

13. The non-transitory computer-readable storage medium of claim 7, wherein the processing device is further to:

detect a request to modify the object;

detect that the object is marked as a candidate for version incrementation;

update the object version of the data of the object responsive to the object being marked as a candidate for version incrementation; and clear the mark of the object to indicate that the object is not a candidate for version incrementation.

14. The non-transitory computer-readable storage medium of claim 7, wherein to update the object version of data, the processing device is to:

increment a first value of an on-disk version of the data that is stored in a persistent data store; and increment a second value of an in-memory version of the data to match the first value that is stored in a persistent data store.

15. A system comprising: a memory; and a processing device, operatively coupled to the memory, to:

identify an object that is associated with an object version indicating a modification operation that has been performed on the object, wherein the object is associated with a signing version having a corresponding first signature for the object, wherein the first signature is stored in a data store and is generated using at least one of data or metadata of the object associated with the first signature, and wherein the signing version of the object is stored in the data store;

obtaining an on-disk value of the object version stored in the data store, wherein the on-disk value of the object version has a numeric data type, and wherein the on-disk value of the object version is updated responsive to the modification operation performed on the object conditionally upon an increment indicator being set on the on-disk value of the object version;

obtaining a value of the signing version of the object stored in the data store, wherein the value of the signing version of the object has the numeric data type, and wherein the value of the signing version is updated responsive to a generation of the first signature of the object;

determine whether the object is currently under modification by comparing a current on-disk value of the object version to the stored value of the signing version of the object; and responsive to determining that the on-disk value of the object version does not match the value of the signing version:

determine that the object is currently under modification, and exclude the object from a data integrity analysis, wherein to perform the data integrity analysis on the object, the processing device is to create a second signature for the object using the data of the object.

16. The system of claim 15, wherein the processing device is further to:

responsive to determining that the on-disk value of the object version matches the value of the signing version:

determine that the object is not under modification; and perform the data integrity analysis on the data of the object by:

creating a second signature for the object using the data of the object; and determining whether the first signature matches the second signature.

17. The system of claim 16, wherein the processing device is further to:

mark the data of the object as corrupt, responsive to a determination that the first signature does not match the second signature.

18. The system of claim 16, wherein the processing device is further to:

perform an action pertaining to the data of the object, responsive to a determination that the first signature does not match the second signature.

19. The system of claim 15, wherein the object version and the signing version are stored in one or more extended attributes of an inode of the object.

20. The system of claim 15, wherein the first signature is created in response to determining a file descriptor table for the object does not contain a file descriptor, wherein the file descriptor table not containing a file descriptor indicates that the object is not under modification.

* * * * *